(12) United States Patent
Paulsen et al.

(10) Patent No.: US 8,754,869 B2
(45) Date of Patent: Jun. 17, 2014

(54) SURFACE CAPACITANCE WITH AREA GESTURES

(75) Inventors: Keith Paulsen, Salt Lake City, UT (US); Jared G. Bytheway, Sandy, UT (US)

(73) Assignee: Cirque Corporation, Salt Lake City, UT (US)

( * ) Notice: Subject to any disclaimer, the term of this patent is extended or adjusted under 35 U.S.C. 154(b) by 383 days.

(21) Appl. No.: 12/719,717

(22) Filed: Mar. 8, 2010

(65) Prior Publication Data

US 2010/0328253 A1  Dec. 30, 2010

Related U.S. Application Data

(63) Continuation-in-part of application No. 12/592,283, filed on Nov. 20, 2009, now Pat. No. 8,194,046.

(60) Provisional application No. 61/158,281, filed on Mar. 6, 2009.

(51) Int. Cl.
*G06F 3/044* (2006.01)

(52) U.S. Cl.
USPC ......................................................... 345/174

(58) Field of Classification Search
None
See application file for complete search history.

(56) References Cited

U.S. PATENT DOCUMENTS

| | | | |
|---|---|---|---|
| 5,940,065 A | 8/1999 | Babb et al. | |
| 6,058,485 A | 5/2000 | Koziuk | |
| 7,084,933 B2 * | 8/2006 | Oh et al. | 349/12 |
| 7,872,693 B2 | 1/2011 | Chen | |
| 8,054,300 B2 * | 11/2011 | Bernstein | 345/174 |
| 2007/0063987 A1 | 3/2007 | Sato et al. | |
| 2008/0007539 A1 * | 1/2008 | Hotelling | 345/173 |
| 2008/0048997 A1 | 2/2008 | Gillespie et al. | |
| 2009/0008161 A1 | 1/2009 | Jones et al. | |
| 2009/0009487 A1 | 1/2009 | Nishitani et al. | |
| 2009/0267905 A1 * | 10/2009 | Hsu et al. | 345/173 |
| 2009/0309851 A1 * | 12/2009 | Bernstein | 345/174 |
| 2010/0127717 A1 * | 5/2010 | Cordeiro et al. | 324/678 |
| 2010/0177061 A1 * | 7/2010 | Gray | 345/174 |
| 2010/0328241 A1 * | 12/2010 | Paulsen et al. | 345/173 |
| 2010/0328253 A1 * | 12/2010 | Paulsen et al. | 345/174 |
| 2011/0063242 A1 * | 3/2011 | Bytheway et al. | 345/174 |
| 2011/0291982 A1 | 12/2011 | Hsieh et al. | |

* cited by examiner

*Primary Examiner* — Joseph Haley
(74) *Attorney, Agent, or Firm* — Morriss O'Bryant Compagni, PC

(57) ABSTRACT

A surface capacitance touch sensitive surface (or "surface cap panel") suitable for use in a touch screen or touchpad, wherein the surface cap panel has a substantially even coating of a conductive material on a non-conductive substrate and then covering the conductive material with a dielectric material, wherein a novel current measuring circuit reduces the effect of stray capacitance on the accuracy of a current measurement so that the relative X and Y position of an object on the surface cap panel can be determined using simple ratio equations, and wherein measuring the charge transfer rate in a measuring circuit, in addition to the total charge transfer for each toggle event, enables the location of two objects to be identified on the surface cap panel, wherein the charge transfer rate is used to determine the distance between two points of contact on the surface cap panel, and wherein height and width information related to the distance between the two points of contact can now be determined by doubling the number of electrodes at the corners of the surface cap panel.

8 Claims, 9 Drawing Sheets

SURFACE CAPACITANCE WITH AREA GESTURES

CROSS REFERENCE TO RELATED APPLICATIONS

This document claims priority to, and incorporates by reference all of the subject matter included in the provisional patent application, having Ser. No. 61/158,281 and filed on Mar. 6, 2009, and is a Continuation-in-Part of application 4455.CIRQ.NP, having Ser. No. 12/592,283 and filed on Nov. 20, 2009.

BACKGROUND OF THE INVENTION

1. Field of the Invention

This invention relates generally to touchpads using surface capacitance technology. More specifically, the present invention is a new method of determining the position of a pointing object or objects on a surface capacitance touch panel.

2. Description of Related Art

Capacitive touch screens are readily available for use in diverse applications. As touch sensitive screens become more popular and more useful, the technologies to implement them are also evolving.

Several different touch screen and touchpad technologies have emerged including projected capacitance methods and surface capacitance methods. Projected capacitance methods are currently required to implement gestures that utilize more than one finger or pointing object on the surface at the same time.

For example, FIG. 1 is a top view of an array of orthogonal electrodes 6, such as a plurality of X (2) and Y (4) electrodes, which are often used in touchpad and touch screen technologies such as those produced by Cirque Corporation®. However, projected capacitance methods generally cost more to implement than surface capacitance methods because of the more intricate processes required to etch electrode patterns into a conductive surface.

An example of surface capacitance technology is shown in FIG. 2. Such a surface cap panel 10 is a solid sheet of a conductive material 16 disposed on an insulating substrate 18 such as glass, with sensors 12 disposed at the corners. The traditional method of measuring the position of a pointing object 14 or the "touch position" on the surface capacitance touch panel 10 is to apply an AC signal on all four corners of the touch panel's conductive layer 16. The conductive layer 16 can be made, for example, of Indium Tin Oxide (ITO).

To create the touch panel 10, the surface of the glass substrate 18 is flooded or covered with a substantially even layer of a resistive ITO material which forms a sheet resistance. A dielectric is then applied to cover the ITO conductive material.

After applying the AC signal to the conductive ITO material 16, the next step is to triangulate the touch position using the current flowing through each corner. It is common to apply either a sine wave or a square wave.

If an object such as a finger 14 comes in contact with the surface of the touch panel 10, a capacitor is formed between the ITO surface 16 and the finger tip 14. The capacitance value is very small, typically in the order of 50 pF. The amount of charge or current that has to be measured going into each corner 12 of the panel is therefore very small. Because the current is so small, the system is very susceptible to stray capacitance. Thus, the accuracy of touch panels 10 is often an issue.

With these two different touch technologies in mind, it is observed that software applications in portable and stationary electronic appliances such as computers, smart phones, and any other device that can use a touch interface, are now beginning to use a second point of contact (such as a finger and thumb or two fingers) to support gestures such as "pinch and zoom", pan, rotate, etc. Other applications use a third simultaneous contact for a "next and previous" gesture, and even a fourth simultaneous contact for switching between applications.

Multi-finger gestures can also be accomplished using an "area gesture", such as in the method taught by Cirque Corporation®, wherein multiple contacts are not tracked but instead the area gesture is accomplished by seeing the multiple contacts as only a single large object, where the multiple contacts only define the outer boundaries of the large object. The multiple points of contact can therefore be considered to have a height and a width.

Operating system software and Human Interface Device (HIG) standards are being modified to include these new gestures and methods of reporting multi-finger contact with a touch sensitive surface.

Unfortunately, it has not been possible to utilize the less expensive surface capacitance touch screens or touchpads (hereinafter to be referred to as "surface cap panels") to support multi-finger gestures or area gestures because there has not been a suitable method available for tracking more than one point of contact or for determining the outer boundaries of a large object as defined by area gesture method of Cirque Corporation® for multiple points of contact. In other words, it has not been possible to determine height and width of a large object.

Accordingly, it would be an advantage over the state of the art to be able to utilize area gestures defined by multiple points of contact with surface cap panels that are being used as touch screens and as touchpads. Such a system would enable new multi-touch technology to be used with simpler touch screen and touchpad technology.

BRIEF SUMMARY OF THE INVENTION

In a first embodiment, the present invention is a surface capacitance touch sensitive surface (or "surface cap panel") suitable for use in a touch screen or touchpad, wherein the surface cap panel has a substantially even coating of a conductive material on a non-conductive substrate and then covering the conductive material with a dielectric material, wherein a novel current measuring circuit reduces the effect of stray capacitance on the accuracy of a current measurement so that the relative X and Y position of an object on the surface cap panel can be determined using simple ratio equations, and wherein measuring the charge transfer rate in a measuring circuit, in addition to the total charge transfer for each toggle event, enables the location of two objects to be identified on the surface cap panel, wherein the charge transfer rate is used to determine the distance between two points of contact on the surface cap panel, and wherein height and width information related to the distance between the two points of contact can now be determined by doubling the number of electrodes at the corners of the surface cap panel.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

Figure 1:
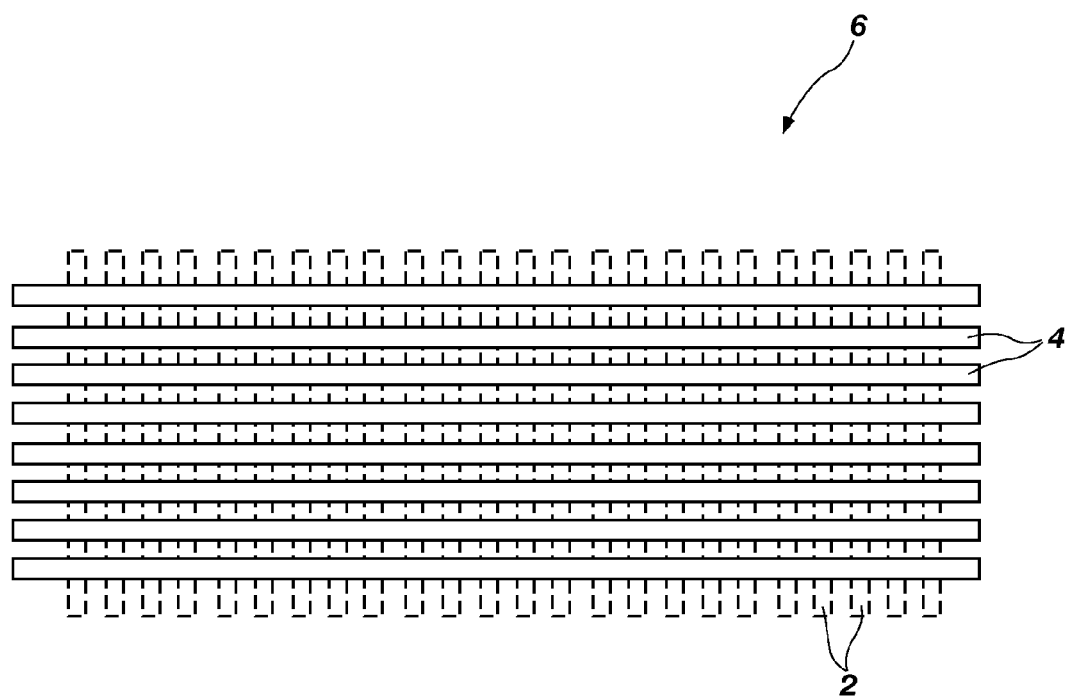
FIG. 1 is a perspective view of a X and Y electrode grid touchpad as found in the prior art.
Figure 2:
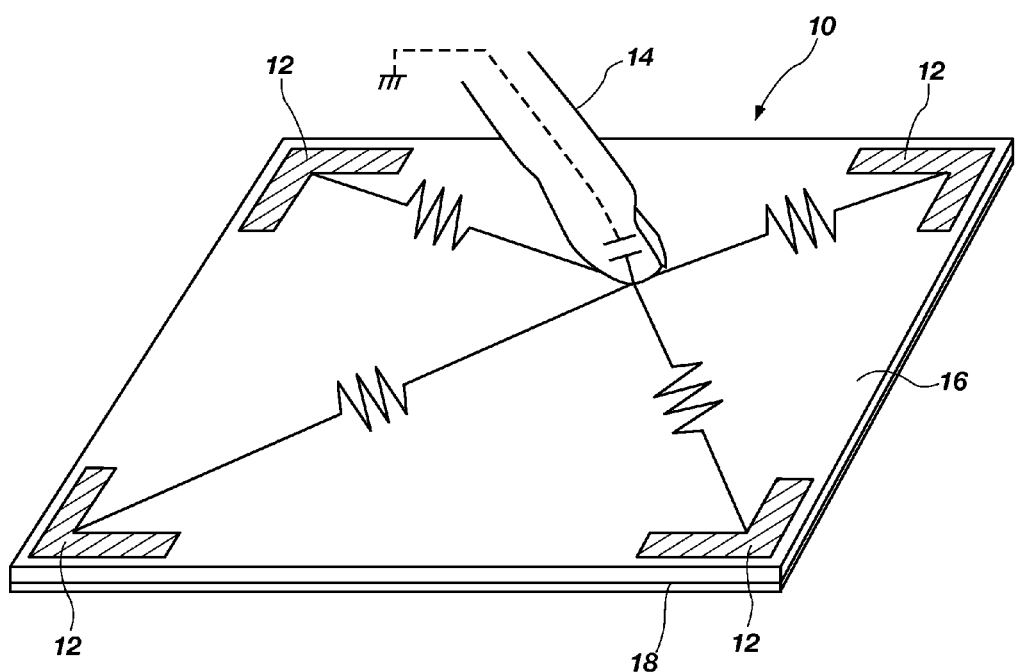
FIG. 2 is a perspective view of a surface cap panel as found in the prior art.
Figure 3:
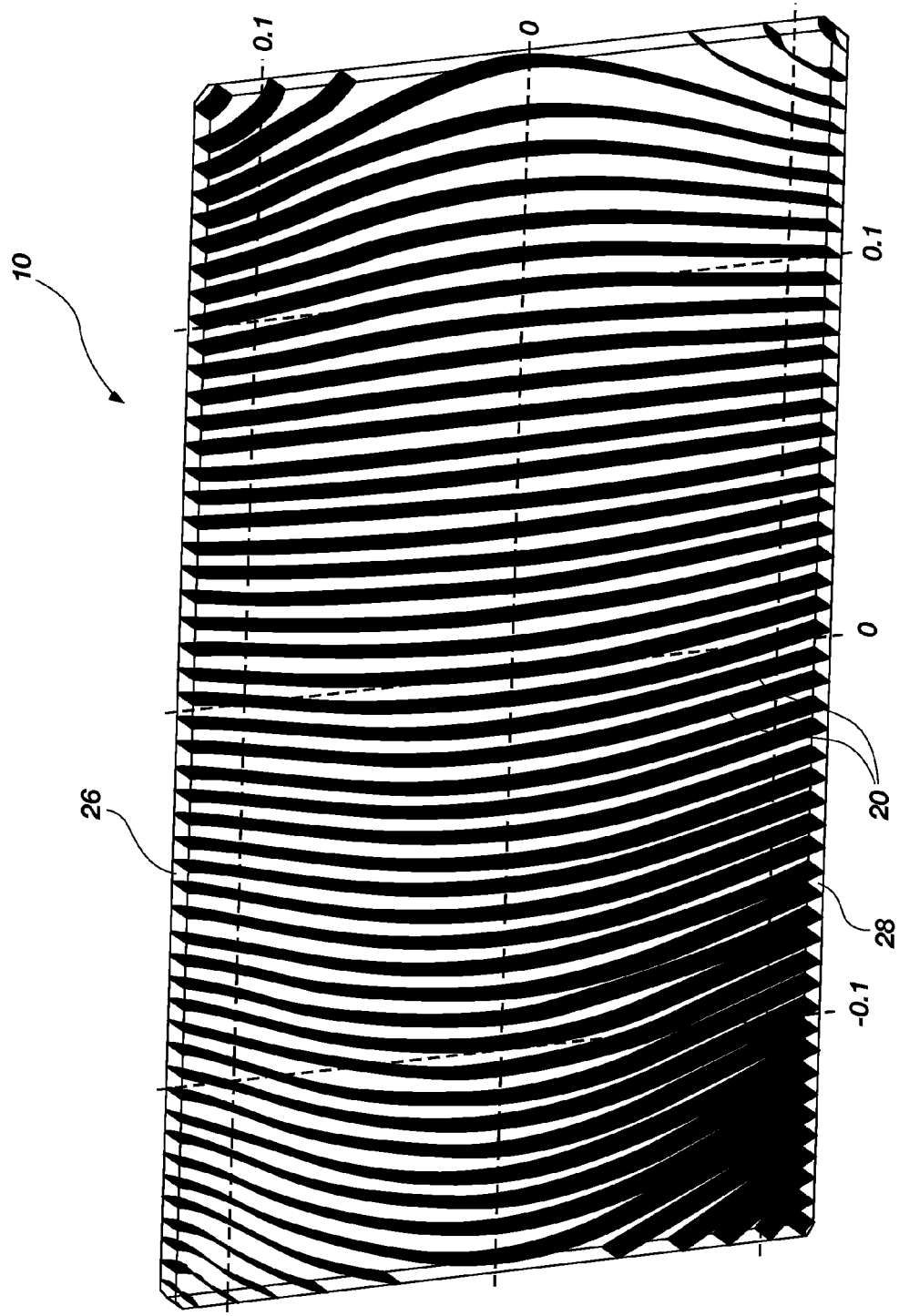
FIG. 3 is a perspective view of a surface cap panel 10 that is made in accordance with the principles of the present invention.
Figure 4:
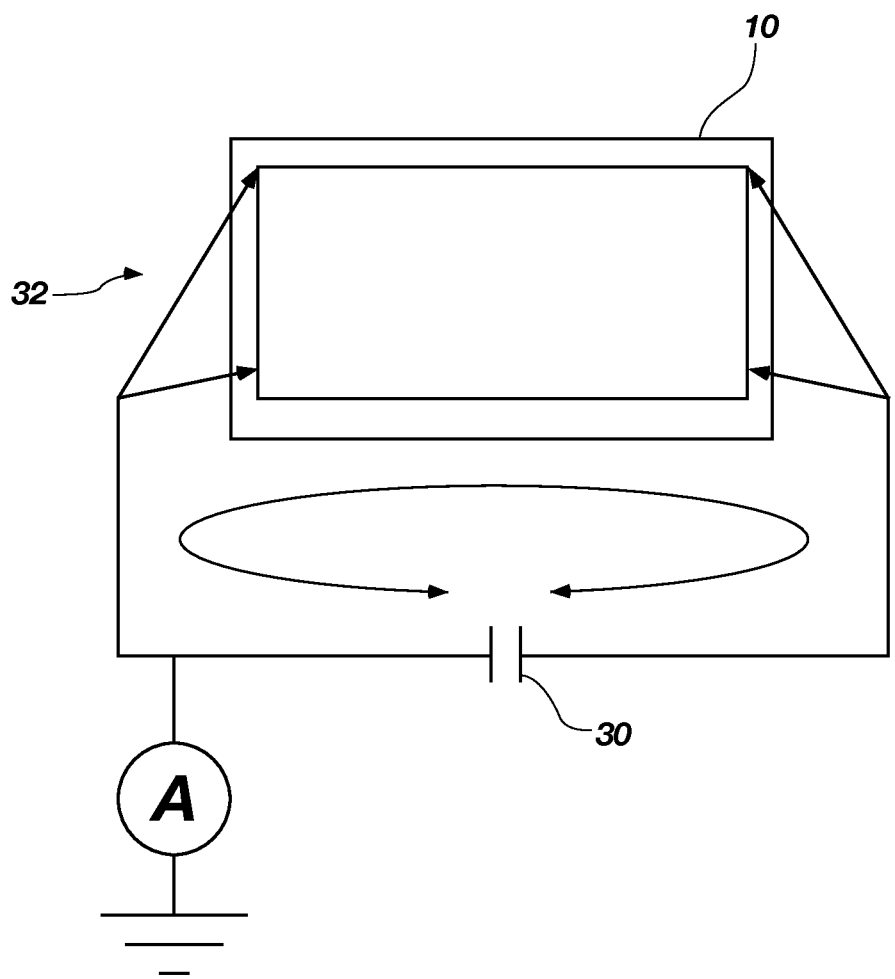
FIG. 4 is a circuit diagram showing how a current measuring circuit comprised of a capacitor and a current measuring sensor is applied to the surface cap panel when a single object is present.

FIG. 3 is a perspective view of a surface cap panel 10 that is made in accordance with the principles of the present invention. As disclosed in the co-pending application; a new and novel approach to determining the position of an object on the touch panel is to charge a large capacitor and then apply this "flying capacitor" to two opposite ends of the touch panel 10. In the flying capacitor method of the present invention, this method measures the instantaneous and total current induced in a contact on a surface of the surface cap panel 20 when a constant voltage gradient is produced across the surface in a single axis. A sensitive current measuring circuit 32 as shown in FIG. 4 is applied to the surface cap panel 10 to make this current measurement. The flying capacitor 30 is used to charge the surface cap panel 10. Any charge that is removed from the surface cap panel 10 is measured with the current measuring circuit 32.

Linearity of a voltage gradient can improve accuracy of the surface cap panel 10 in FIG. 3. Therefore, in a first step, it is desirable but not essential that a lower resistance material be added around the edges of the touch panel 10 on the surface. The voltage gradient lines 20 become closer and more linear from a top edge 26 to a bottom edge 28.

In the co-pending application Ser. No. 12/592,283, it was explained that four measurements were needed in order to determine the location of a single object on the surface cap panel 10. The present invention extends the capability of the "flying cap" method of position determination by using what is referred to as the "8 Wire Method".

Figure 5:
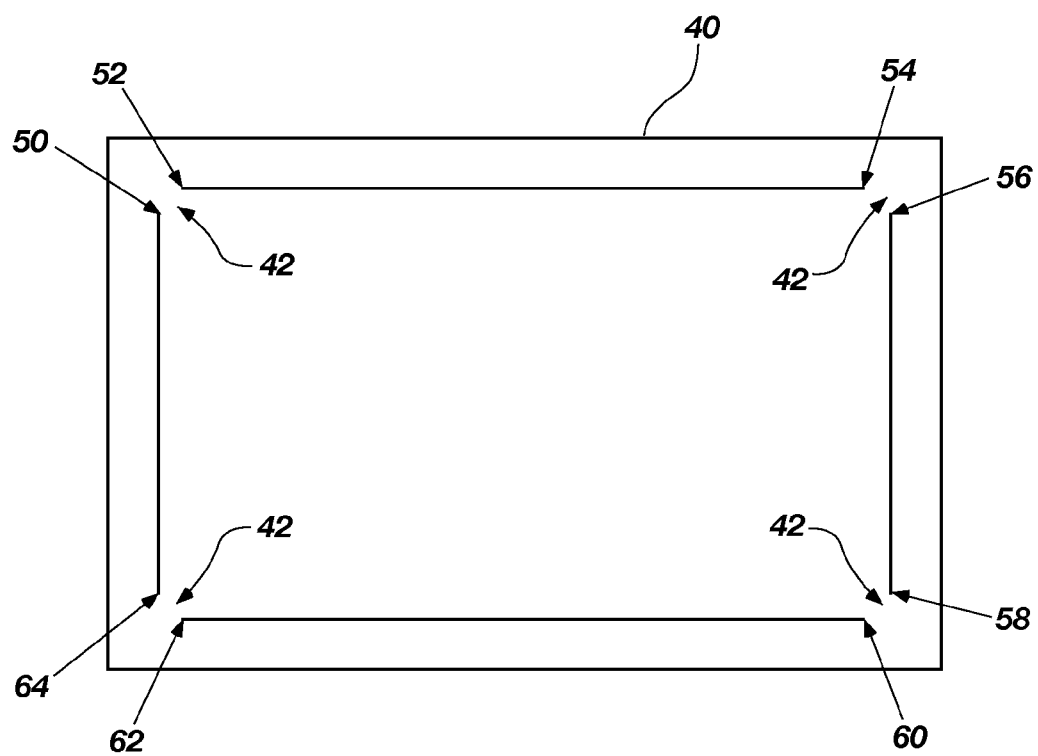
FIG. 5 is a top view of a surface cap panel in the first embodiment for use with the 8 Wire Method that can detect a plurality of objects.

The surface cap panel 40 used for the 8 Wire Method is shown in FIG. 5. In this surface cap panel 40, a gap 42 is created in each corner so that individual electrodes can be connected to the low resistance material at each end of the low resistance path. Thus, electrodes are coupled at 50, 52, 54, 56, 58, 60, 62 and 64, which are the 8 wires of the 8 Wire Method. The low resistance paths are separated but are sufficiently close to each other so as to form the constant voltage gradient as in the 4 Wire Method of the co-pending application.

The 8 Wire Method is performed by measuring the charge transfer rate in addition to the total charge transfer for each event. An event is defined as when a measurement is taken. The charge transfer rate is used to determine the distance between two points of contact on the surface cap panel 40. Height and width information related to the distance between the two points of contact is thus determined by doubling the number of electrodes at the corners of the surface cap panel 40.

Figure 6:
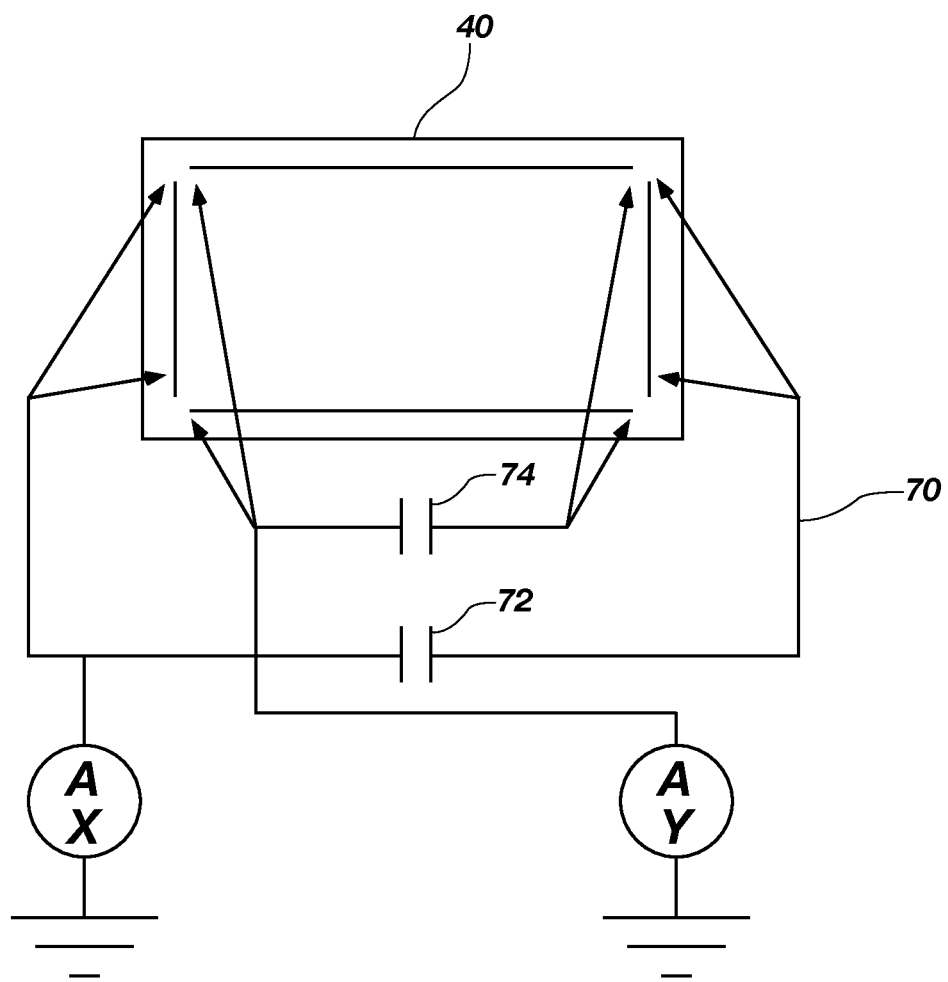
FIG. 6 is a circuit diagram showing how a current measuring circuit comprised of two capacitors and two current measuring sensors are applied to the surface cap panel to detect a plurality of objects.

FIG. 6 shows a modified current measurement circuit 70 that is used in the 8 Wire Method. In FIG. 6, two flying capacitors 72 and 74 are applied simultaneously to the surface cap panel 40. Simultaneous application of the flying capacitors 72 and 74 enables relative measurement of the aggregate resistance between contacts and horizontal and vertical low resistance paths on the surface cap panel 40.

Specifically, the position of the contacts on the surface cap panel 40 is determined by measuring the current through the multiple fingers and determining the effective Norton resistances for each parallel axis to the contacts.

The Norton resistance is derived by two (2) successive integrations of the current in each axis. The two (2) measurements integrated over a long and short aperture of time allow for the RC time constant to be determined. The position or proximity of a contact to an edge is then derived from the computed resistance between the contact and the edge. The total integrated current (area under the curve below) is proportional to the finger capacitance.

Figure 7:
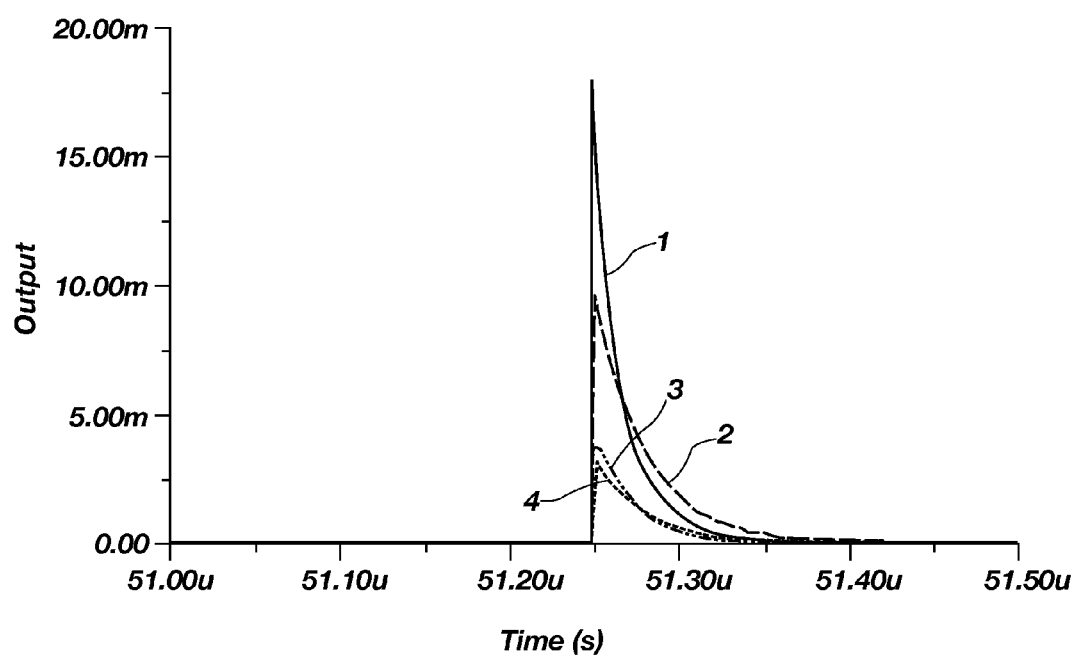
FIG. 7 is a graph showing the measurements made during different time apertures.

The pinch gesture in one axis shown in FIG. 7 illustrates the changes in the time constant of the current as contacts are moved apart. 2/1 are before and after measurements as the fingers are first close together (2 and 4) and then farther apart (1 and 3). A larger "short measurement" of 1 versus 2 indicates a larger pinch in that axis.

The present invention also extends the capability of the previous 4 Wire "flying cap" method by measuring rapid changes in capacitance to detect a second point of contact. Holding the first point of contact position fixed and moving the second point of contact provides midpoint location information that can now be used, for example, to provide information for a "rotate" gesture.

The 8 Wire Method operates on the same principle as the 4 Wire Method of the co-pending application because individual electrodes are connected to the low resistance material at each end of the electrodes. The current induced in the low resistance material is many times larger than the current induced in a finger or other point of contact on the surface cap panel.

Figure 8:
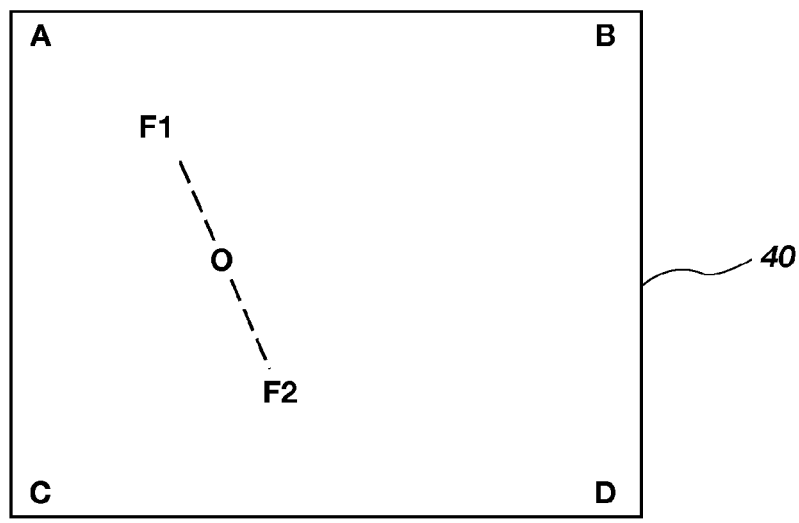
FIG. 8 is a top view of a surface cap panel that shows in which corners the electrodes of the current measuring circuit are p laced for the 8 different measurements that must be made in order to detect a plurality of objects.

FIG. 8 is a block diagram of a surface cap panel 40 of the present invention. The corners of the surface cap panel are labeled A, B, C and D. F1 is an arbitrarily selected point of contact for a first pointing object. F2 is an arbitrarily selected point of contact for a second pointing object. O is labeled as the midpoint between points of contact F1 and F2.

Oppositely charged capacitors are applied successively between Detect Electrodes and Drive Electrodes. Charge that is leaving the surface cap panel in a specific aperture of time is accumulated in a specific aperture of time. There are 8 different combinations of electrode patterns and accumulation time apertures. There are a total of 8 different measurements that must be taken. The 8 measurements or combinations of electrodes and time apertures are listed as Iterations in TABLE 1.

The calculations that must be performed are as follows: $Z1=M1+M2$, $Z2=M3+M4$, $X=M3/Z2$, $Y=M1/Z1$, $Z=Z1+Z2$. A calculation to analyze a pinching movement is thus defined as $Pinch=M1/M5+M2/M6+M3/M7+M4/M8$.

The aspect ratio related to the vertical and horizontal spacing of contacts is determined by the average of the ratio of Ax and Ay for each measurement (M1 through M8). Thus $MRn=(Axn-Ayn)/(Axn+Ayn)$. And the Aspect Ratio$=(MR1/MR5+MR2/MR6+MR3/MR7+MR4/MR8)/4$.

Figure 9:
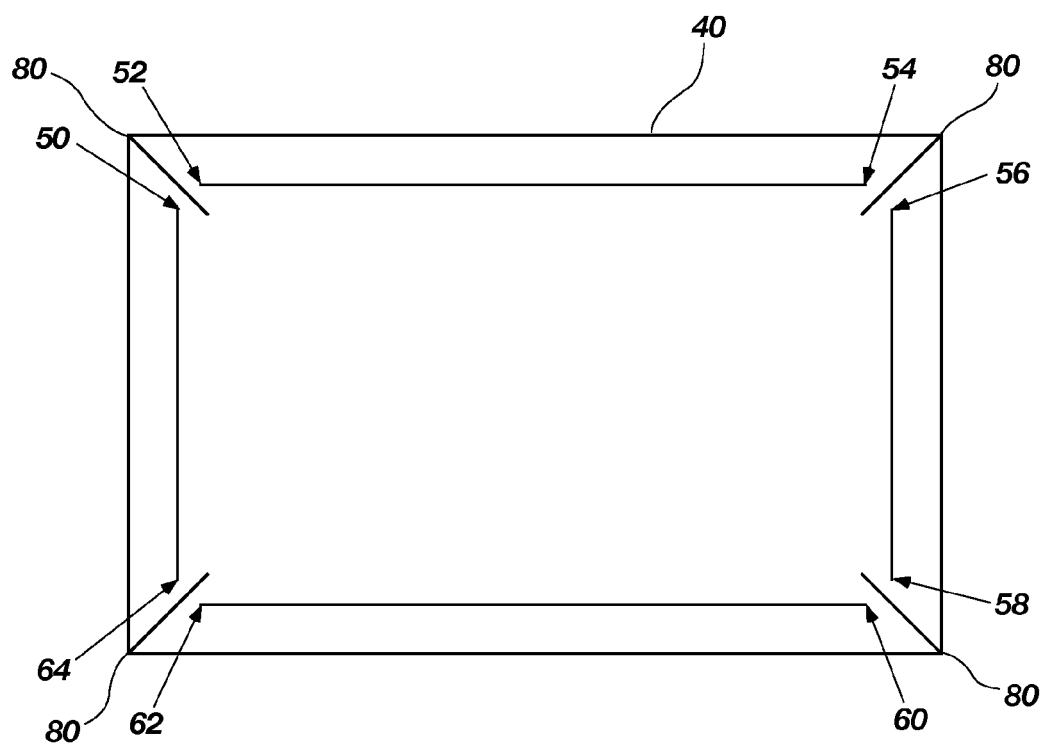
FIG. 9 is an alternative embodiment of a surface cap panel that can be used in the present invention.

FIG. 9 is provided as an alternative embodiment of the surface cap panel 40. In this figure a small slot 80 is created in the surface resistive material at each corner to further separate the electrodes 50, 52, 54, 56, 58, 60, 62 and 64. The slot 80 extends from the outside corner protruding up to the active area of the surface cap panel 40 where contacts are made.

It is to be understood that the above-described arrangements are only illustrative of the application of the principles of the present invention. Numerous modifications and alternative arrangements may be devised by those skilled in the art without departing from the spirit and scope of the present invention. The appended claims are intended to cover such modifications and arrangements.

TABLE 1

| Iteration | Detect Electrodes | Drive Electrodes | Time Aperture |
|---|---|---|---|
| M1 | A B | C D | Long |
| M2 | C D | A B | Long |
| M3 | A C | B D | Long |
| M4 | B D | A C | Long |
| M5 | A B | C D | Short |
| M6 | C D | A B | Short |
| M7 | A C | B D | Short |
| M8 | B D | A C | Short |

What is claimed is:

1. A method for measuring the position of a plurality of pointing objects on a surface capacitance touch panel (surface cap panel), said method comprising:
   1) providing a surface capacitance touch sensitive surface comprised of a surface cap panel having an insulating substrate, a resistive material disposed on the substrate and formed as a single and planar sheet, and a dielectric disposed on the resistive material;
   2) connecting a first capacitor to opposite edges of the surface cap panel while simultaneously connecting a second capacitor to different opposite edges and measuring current across the surface cap panel using a current measuring circuit in different directions across the surface cap panel, and for different time apertures, and making current measurements in a group of first time apertures and in a group of shorter time apertures relative to the first time apertures; and
   3) triangulating a position of the multiple pointing objects using the measurements obtained above.

2. The method as defined in claim 1 wherein the method further comprises the step of providing a known voltage charge on the first and second capacitors in order to determine how much current is being drained from the surface of the touch panel by the presence of the each of the multiple pointing objects.

3. The method as defined in claim 1 wherein the method further comprises performing the following measurements for the first time aperture:
   1) Drive electrodes at the bottom and detect electrodes at the top of the surface cap panel;
   2) Drive electrodes at the top and detect electrodes at the bottom of the surface cap panel;
   3) Drive electrodes at the left side and detect electrodes at the right side of the surface cap panel; and
   4) Drive electrodes at the right side and detect electrodes at the left side of the surface cap panel.

4. The method as defined in claim 3 wherein the method further comprises performing the following measurements for the shorter time aperture:
   1) Drive electrodes at the bottom and detect electrodes at the top of the surface cap panel;
   2) Drive electrodes at the top and detect electrodes at the bottom of the surface cap panel;
   3) Drive electrodes at the left side and detect electrodes at the right side of the surface cap panel; and
   4) Drive electrodes at the right side and detect electrodes at the left side of the surface cap panel.

5. The method as defined in claim 4 wherein the method further comprises the step of using the 8 current measurements to determine the location of the plurality of pointing objects on the surface cap panel.

6. The method as defined in claim 1 wherein the method further comprises the step of creating a linear voltage gradient across the surface cap panel using the first and the second capacitors.

7. The method as defined in claim 6 wherein the method further comprises the step of refreshing the first capacitor and the second capacitor to a known voltage in order to maintain the voltage gradient across the surface cap panel.

8. The method as defined in claim 1 wherein the method further comprises the step of increasing accuracy of the method for measuring the position of the plurality of pointing objects on the surface cap panel by only allowing the current to drain to the plurality of pointing objects and to the current measurement circuit.

\* \* \* \* \*